Aug. 15, 1950  C. H. SMITH, JR  2,518,499

ELECTRONIC COUNTER CIRCUIT

Filed April 7, 1945  3 Sheets-Sheet 1

Inventor
CARL H. SMITH, JR.

By Ralph L Chappell

Attorney

Aug. 15, 1950 C. H. SMITH, JR 2,518,499

ELECTRONIC COUNTER CIRCUIT

Filed April 7, 1945 3 Sheets-Sheet 2

Inventor
CARL H. SMITH, JR.

By Ralph L Chappell
Attorney

Aug. 15, 1950 C. H. SMITH, JR 2,518,499

ELECTRONIC COUNTER CIRCUIT

Filed April 7, 1945 3 Sheets-Sheet 3

Inventor
CARL H. SMITH, JR.

By Ralph L. Chappell
Attorney

Patented Aug. 15, 1950 2,518,499

UNITED STATES PATENT OFFICE 2,518,499

ELECTRONIC COUNTER CIRCUIT

Carl Harrison Smith, Jr., Arlington, Va.

Application April 7, 1945, Serial No. 587,197

5 Claims. (Cl. 250—27)

(Granted under the act of March 3, 1883, as amended April 30, 1928; 370 O. G. 757)

This invention relates in general to an electronic counter circuit and in particular to a capacitor type of counter circuit.

It is an object of this invention to provide a capacitor type counter circuit wherein the time delay between the leading edge of the last pulse of the count down cycle and the leading edge of the output pulse is a minimum.

It is another object of this invention to provide a capacitor type counter circuit wherein the output pulse, which designates the end of the count down cycle, is of rectangular shape and of controllable time duration.

Other objects and features of the present invention will become apparent upon a careful consideration of the following detailed description when taken together with the accompanying drawings.

In the type of counter circuit to which the invention relates, a storage capacitor is employed and arranged so that it charges a certain voltage increment for each input pulse applied to the circuit. Then, after the voltage on the storage capacitor reaches a certain level, due to the application of a predetermined number of input pulses a pulse generator is set into operation. Simultaneously, means are operated to discharge the storage capacitor whereby the count down cycle is completed.

Figure 1:
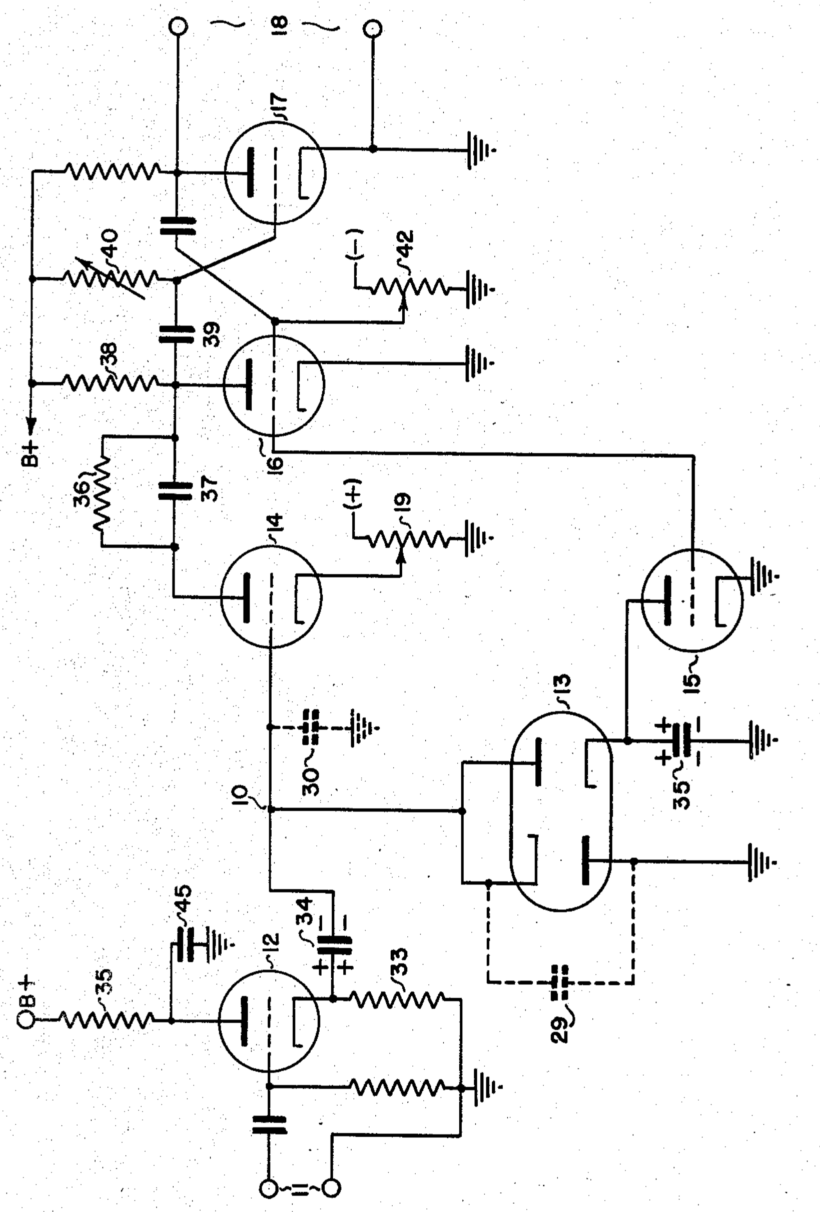
Fig. 1 is a circuit diagram of one embodiment of the invention.

A counter circuit operating in the aforementioned manner is shown in Fig. 1. In the figure, the tube 13, which is represented as a duplex diode, has a capacitor 35 disposed in the cathode circuit of the right hand section thereof. The capacitor 35, which may be, for example, about 1000 micro-microfarads in size, constitutes the storage capacitor of the circuit, and across it the step-wise voltage wave, resulting from a succession of input pulses, is developed. The plate and cathode respectively of the right and left hand sections of the diode are tied together and connected through a second capacitor 34 to the output of a cathode follower type of driving stage 12. Capacitors 34 and 35 form a voltage dividing network across which the voltage of the input pulses divides in a manner later to be described. Although the driving stage 12 is shown as being preferably of the cathode follower type it must be understood that an ordinary plate-loaded amplifier may be employed if desired. The principal advantage obtainable from the use of a cathode follower is due to its lower output impedance which exhibits less resistance to the charging of capacitors 34 and 35, which improves the performance of the circuit. The size of the load resistance 33 of the cathode follower 12 is made as small as possible to lower the output impedance of the stage to a minimum for both positive and negative pulses while remaining within the current capabilities of the tube. The size of this resistance may be reduced to a minimum by employing as the cathode follower 12 a tube of high current rating. To help stabilize the plate voltage of the cathode follower and therefore to make the pulses developed across the cathode resistance 33 of uniform amplitude, a long time constant circuit is connected in the plate circuit of the cathode follower 12. This circuit consists of a resistance 35 and a capacitor 45 whose time constant is made large relative to the time interval between the pulses applied to the input terminal 11.

Figure 2:
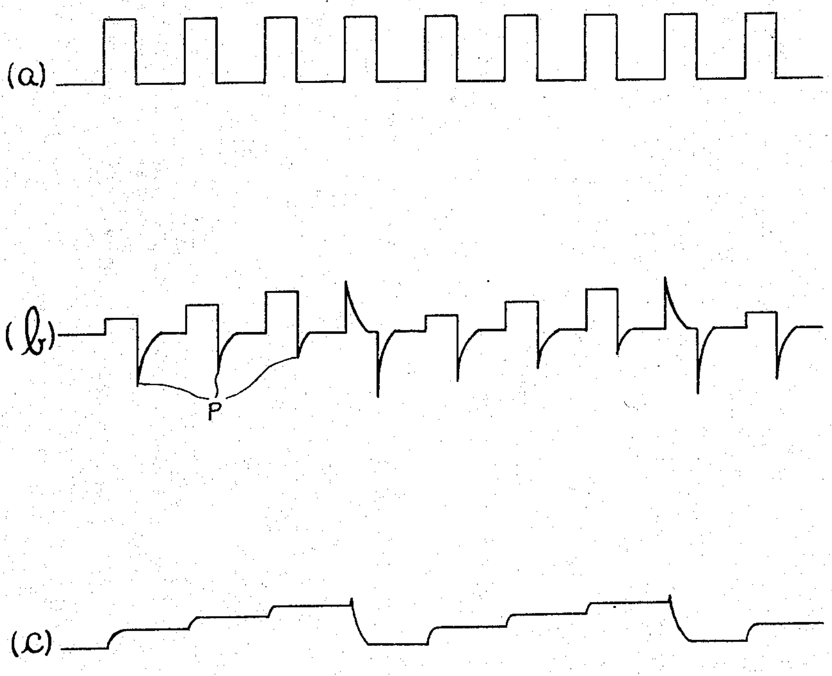
Fig. 2 shows a series of wave forms taken to illustrate the operation of the circuit shown in Fig. 1.

When the potential on the cathode of tube 12 rises in response to the application of an input pulse shown in *a* of Fig. 2 to the terminals 11, the right hand section of the diode 13 conducts and the capacitors 34 and 35 charge in the sense indicated. The voltage of the pulse divides between capacitors 34 and 35 and the stray capacities 29 and 30 that shunt the diode 13. The ratio of the voltages developed across capacitors 34 and 35 is inversely proportional to the ratio of their sizes. To apportion the voltage of the pulse so that the voltage developed across capacitor 35 starts out small at the first pulse and builds up with a succession of input pulses and in the desired stepwise manner, capacitor 34 is made much smaller, about $\frac{1}{10}$ for example, the size of the capacitor 35. When the potential at the cathode of tube 12 drops at the end of an applied input pulse, capacitor 34 and the stray capacities 29 and 30 discharge through the left hand section of the diode 13, while capacitor 35 remains charged. Upon the application of a second positive input pulse, the right hand section of the diode 13 again becomes conducting and capacitor 35 charges up to a new voltage. In this way the voltage developed across capacitor 35 rises in steps as shown by the wave form *c* in Fig. 2.

The potential variation at the juncture point 10 is the result of the combination of several effects. When the right hand section of the diode is conducting, which is during the application of an input positive pulse, the potential at the juncture point 10 is equal to the sum of the existing charge on the capacitor 35 and the voltage drop across the diode. When the left hand section of the diode is conducting, which is during the period between input pulses, the capacitor 34 and the stray capacities 29 and 30 discharge and the juncture point 10 returns to ground potential. Waveform *b* in Fig. 2 is representative of the voltage variation at the juncture point 10. The voltage increment of the input pulses appearing at point 10, as well as the voltage increment across capacitor 35, is not constant but decreases slightly with each succeeding input pulse. The sharp negative "spike" voltages *p* appearing at the trailing edges of the voltage pulses shown in waveform *b* are the result of the discharge of the capacitor 34 and the stray capacities 29 and 30 through the resistance of the left section of the diode 13.

It will be noted from the waveforms of Fig. 2 that the leading edges on the voltage steps developed across capacitor 35 are sloping while the leading edges of the input pulses appearing at the juncture point 10 are comparatively abrupt. The sloping edges of waveform *c* are due to the resistance of the diode 13 through which capacitor 35 must charge, while the comparatively abrupt leading edges of waveform *b* are produced by the capacity divider effect of the stray capacities 29 and 30 and the capacitor 34 and the low resistance charging path for stray capacities 29 and 30 in comparison to the resistance of the charging path for capacitor 35. The potential at the juncture point 10 rises substantially instantaneously, and without overshoot to a value equal to the sum of the voltage across capacitor 35 and the drop across the diode 13. Therefore to key a pulse generator at the end of the count down cycle with a minimum of time delay, the voltage pulses appearing at the input side of the diode 13 with their abrupt leading edges will be utilized rather than the voltage developed across the capacitor 35.

In carrying out the above principle, the input voltage pulses appearing at the juncture point 10 are direct coupled to the control grid of a triode keying tube 14. This tube is equipped with a plate load resistance 38 which also serves as the plate load resistance for tube 16 in a multivibrator circuit comprising tubes 16 and 17. In the multivibrator circuit the grid of tube 17 is returned to a source of B+ potential through the variable resistance 40 while the grid of tube 16 is returned to a source of negative biasing potential through the potentiometer 42. With this arrangement the quiescent state of the multivibrator will exist when tubes 16 and 17 are non-conducting and conducting respectively. In operation, the cathode potentiometer 19 is set so as to operate tube 14 at such a point below its cut-off potential as to prevent it from being driven into conduction by the pulses applied to its grid until the charge accumulated on capacitor 35 and consequently the amplitude of the pulses at point 10 reaches a predetermined level. For example, under the conditions where a count-down factor of four is desired and the mean voltage increment of the pulses appearing at point 10 is observed to be, say 2.5 volts per pulse, then the bias of tube 14 as set by potentiometer 19 would be 8.5 volts, for example, below cut-off. Different bias settings, of course, would be used for different count down factors. At the instant tube 14 conducts, the abrupt negative pulse it develops across resistance 38 is applied through condenser 39 to the grid of tube 17. Whereupon tube 17 is rendered non-conducting and tube 16 conducting. The period for which tube 17 is held non-conducting and therefore the time duration of the positive output pulse appearing at the terminals 18 is adjusted by the variable resistance 40 and should not exceed the time interval between input pulses. At the instant tube 17 is rendered non-conducting a positive pulse obtained from its plate circuit is applied to the grid of a discharge tube 15. This tube is connected in shunt with the capacitor 35 and serves as a means for discharging the latter at the end of the count down cycle. Resistance 36 connecting the plates of tube 14 and 16 together prevents the low resistance of tube 14, when it is conducting, from effecting the operation of the multivibrator. Condenser 37 bypasses resistance 36 to provide for high speed operation of the multivibrator in response to the start of conduction in tube 14.

Figure 3:
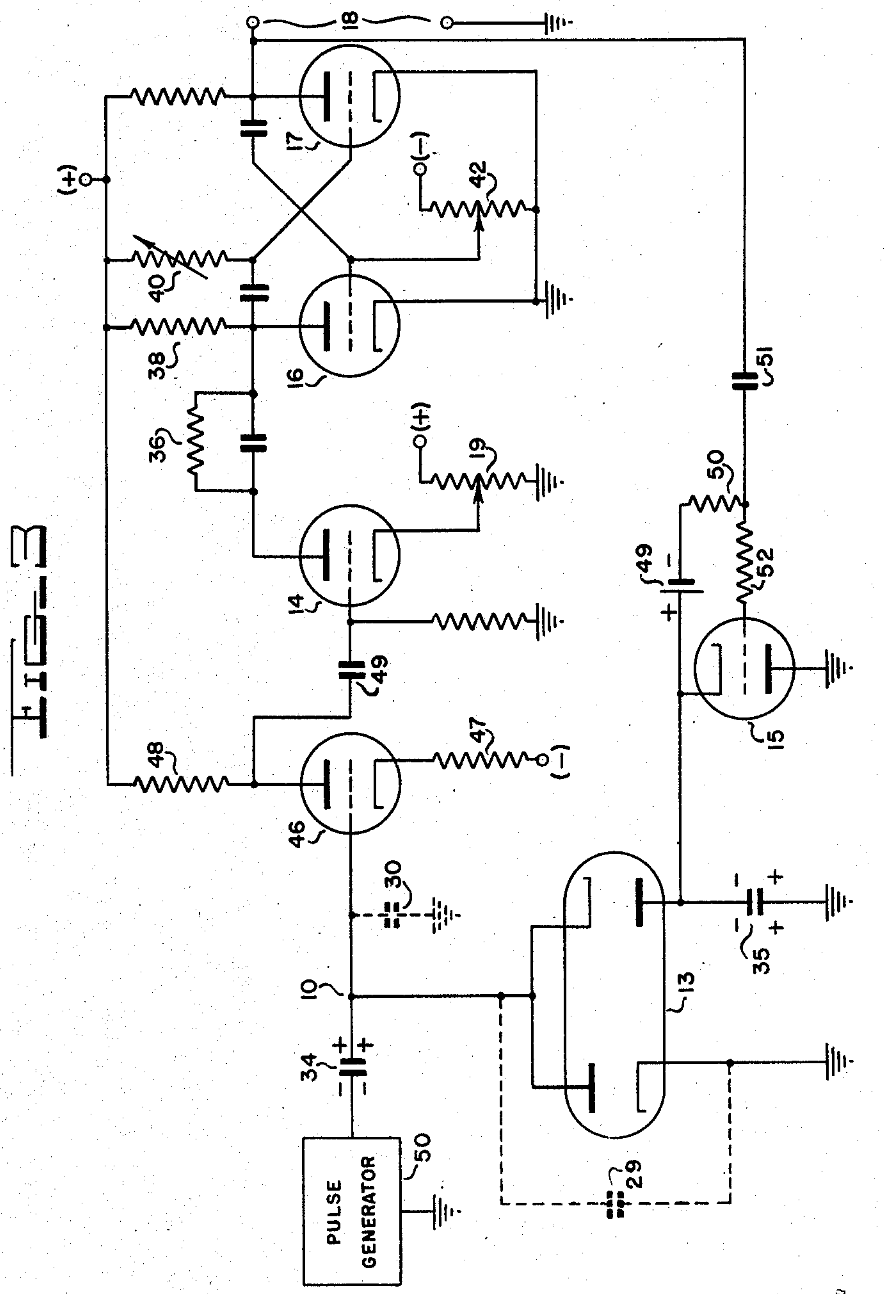
Fig. 3 is a schematic diagram of a modification of the embodiment shown in Fig. 1.

A variant of the counter circuit shown in Fig. 1 is illustrated in Fig. 3. In this figure the counter circuit is adapted to respond to a negative pulse source 50 rather than a positive source as was the case in Fig. 1. The main differences in the two circuits rest in the positioning of the charging capacitor 35, the connections to the means for discharging capacitor 35, and the means for setting the pulse generator 16, 17 into operation.

In the present embodiment the connections to diode 13 are reversed with the capacitor 35 inserted in the plate circuit of the right hand section of diode 13. The manner in which the charges accumulate on capacitor 35 and the gradual build-up of the amplitude of the pulses at the juncture point 10 is the same as before except that they are opposite in polarity.

An inverter tube 46 is interposed between juncture 10 and the keying tube 14. Since it is desirable to cause operation of the pulse generator by producing conduction by 14, the negative pulses from juncture point 10 must be inverted. The operation of the inverter tube is similar to a cathode follower in that a large cathode resistor 47 is employed. This causes the cathode potential to rise and fall with the grid but prevents flow of grid current over the normal range of operation. The negative potential to which the cathode is returned is of a value such that class-A operation of tube 46 will be maintained throughout the count-down cycle. The output voltage of the inverter is taken across a plate load resistor 48 which may be of the same order of magnitude as resistor 47. Thus when the potential at the plate of 46 rises sufficient to unbias tube 14, the pulse generator is set into operation as previously described.

The capacitor discharge switch 15 operates in a manner similar to that previously described, however the tube must be inverted to permit removal of the negative charge on 35. This necessitates a separate bias means, indicated by the battery 49 and a coupling network 50, 51. The grid limiting resistor 52 is inserted to reduce the flow of grid current in tube 15. The grid of switch tube 15 is connected to the plate of tube 17 through a blocking capacitor rather than to the grid of 16 to give a larger amplitude positive pulse for definite operation of the switch 15.

The invention described herein may be manufactured and used by or for the Government of the United States of America for governmental purposes without the payment of any royalties thereon or therefor.

What is claimed is:

1. An electronic frequency division system for receiving a series of input pulse signals of selected recurrence frequency from a pulse source and producing a series of output pulse type signals of lower recurrence frequency in which substantial time coincidence between each output signal and one of the input signals is maintained, comprising; a low output impedance driver stage responsive to the input pulse signals, a first vacuum tube having at least a plate and a cathode, a first capacitor, means connecting said capacitor to the plate of said vacuum tube, a second capacitor, connecting the cathode of said vacuum tube to the output of the driver stage, whereby said first and second capacitors are charged in response to an output from said driver stage, a second vacuum tube having at least a plate, a cathode and a control grid, means directly connecting the control grid of said second tube to the cathode of said first tube, means connected to said second capacitor for discharging said second capacitor in the interval between the applied input pulses, biasing means connected to said second tube for holding said second tube unresponsive until the amplitude of the voltage pulses appearing at the cathode of said first tube reaches a predetermined value, and means connected to said first capacitor also responsive to the attainment of a predetermined amplitude in the voltage pulses appearing at the cathode of said first tube for discharging said first capacitor.

2. An electronic frequency division system for receiving a series of input pulse signals of selected recurrence frequency from a pulse source and producing a series of output pulse type signals of lower recurrence frequency in which substantial time coincidence between each output signal and one of the input signals is maintained, comprising; a cathode follower low output impedance driver stage responsive to the input signals, a first electron tube having at least anode and cathode electrodes, a first capacitor, means connecting said capacitor to one of the electrodes of said tube, a second capacitor, connecting the remaining electrode of said electron tube to the output of the driver stage whereby said first and second capacitors are charged in response to and output from said driver stage, means connected to said second capacitor for discharging said second capacitor in the interval between input signals, a pulse generator, means coupling the voltage pulses appearing at said remaining electrode to the pulse generator, means holding said pulse generator inoperative until the amplitude of the voltage at said remaining electrode reaches a predetermined value, and means connected to said first capacitor responsive to the operation of said pulse generator for discharging said first capacitor.

3. An electronic frequency division system for receiving a series of input pulse signals of selected recurrence frequency from a pulse source and producing a series of output pulse type signals of lower recurrence frequency in which substantial time coincidence between each output signal and one of the input signals is maintained, comprising; a cathode follower low output impedance driver stage responsive to the input signals, a first electron tube having at least anode and cathode electrodes, a first capacitor, means connecting said capacitor to the cathode of said tube, a second capacitor, connecting the anode of said electron tube to the output of the driver stage whereby said first and second capacitors are charged in response to and ouput from said driver stage, means connected to said second capacitor for discharging said second capacitor in the interval between input signals, a pulse generator, means coupling the voltage pulses appearing at said anode to the pulse generator, means holding said pulse generator inoperative until the amplitude of the voltage at the anode of said electron tube reaches a predetermined value, and means connected to said first capacitor responsive to the operation of said pulse generator for discharging said first capacitor.

4. In combination a charging capacitor of comparatively small capacity, a unidirectional conducting device and a storage capacitor of comparatively large capacity connected in series in the order named, means including a low output impedance driver stage for impressing a pulsating voltage across said series circuit thereby causing said pulses to place charges on both capacitors, conducting means connected between the junction of said charging capacitor and said unidirectional conducting device and the free plate of said storage capacitor operative to discharge said charging capacitor during the period between successive applied pulses, discharging means including a keyable pulse generator operatively connected to said storage capacitor to periodically discharge said storage capacitor, and pulse generator keying means connected across said unidirectional conducting device and storage capacitor in series to receive the pulses appearing thereacross, said last named means being further connected to said discharging means to key said pulse generator and thereby to discharge said storage capacitor responsive to the receipt of pulses exceeding a predetermined amplitude.

5. In combination a charging capacitor of comparatively small capacity, a unidirectional conducting device and a storage capacitor of comparatively large capacity connected in series in the order named, means including a low output impedance driver stage for impressing a pulsating voltage across said series circuit thereby causing said pulses to place charges on both capacitors, conducting means connected between the junction of said charging capacitor and said unidirectional conducting device and the free plate of said storage capacitor operative to discharge said charging capacitor during the period between successive applied pulses, a vacuum tube connected across said storage capacitor, a keyable pulse generator connected to said vacuum tube to render said vacuum tube momentarily conducting in response to an output from said pulse generator and pulse generator keying means coupled across said unidirectional conducting device and storage capacitor in series to receive the pulse appearing thereacross, said last named means being further connected to said pulse generator to key said pulse generator and thereby to render said vacuum tube conducting responsive to the receipt of pulses exceeding a predetermined amplitude.

CARL HARRISON SMITH, Jr.

REFERENCES CITED

The following references are of record in the file of this patent:

UNITED STATES PATENTS

| Number | Name | Date |
|---|---|---|
| 2,113,011 | White | Apr. 5, 1938 |
| 2,258,943 | Bedford | Oct. 14, 1941 |

OTHER REFERENCES

RCA Review, July 1940, "Television Sync. Gen," by Bedford et al.